Jan. 26, 1965   A. ALVAREZ CALDERON   3,167,274
AERODYNAMIC SYSTEM AND APPARATUS
Filed Aug. 21, 1963   3 Sheets-Sheet 1
FIG_1
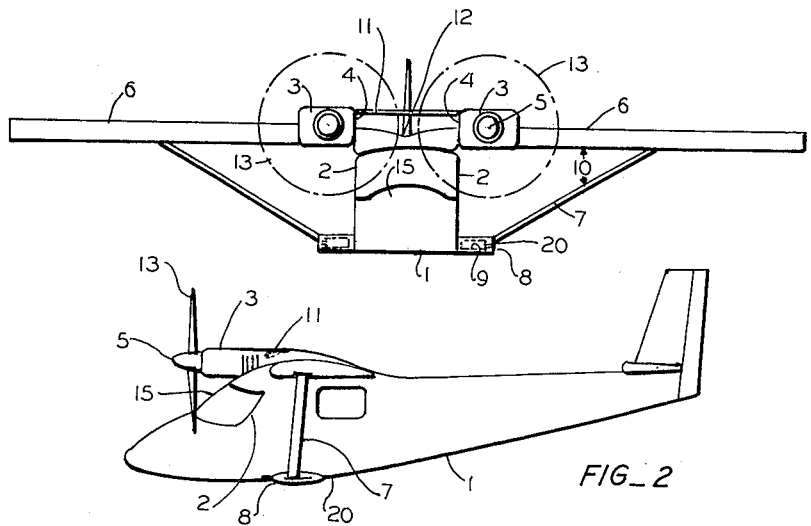
FIG_2
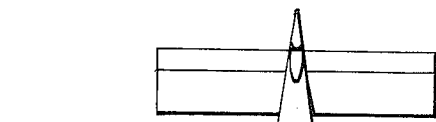
FIG_3
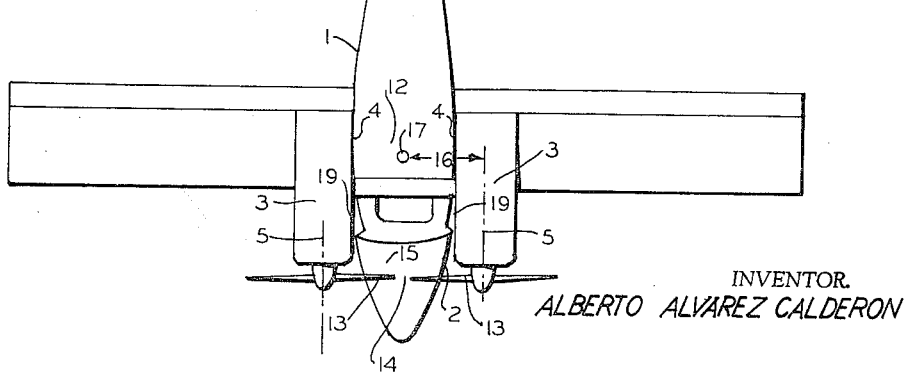
INVENTOR.
ALBERTO ALVAREZ CALDERON Jan. 26, 1965 A. ALVAREZ CALDERON 3,167,274
AERODYNAMIC SYSTEM AND APPARATUS
Filed Aug. 21, 1963 3 Sheets-Sheet 2

INVENTOR.

BY *Alberto Alvarez Calderon*

Jan. 26, 1965  A. ALVAREZ CALDERON  3,167,274
AERODYNAMIC SYSTEM AND APPARATUS
Filed Aug. 21, 1963  3 Sheets-Sheet 3
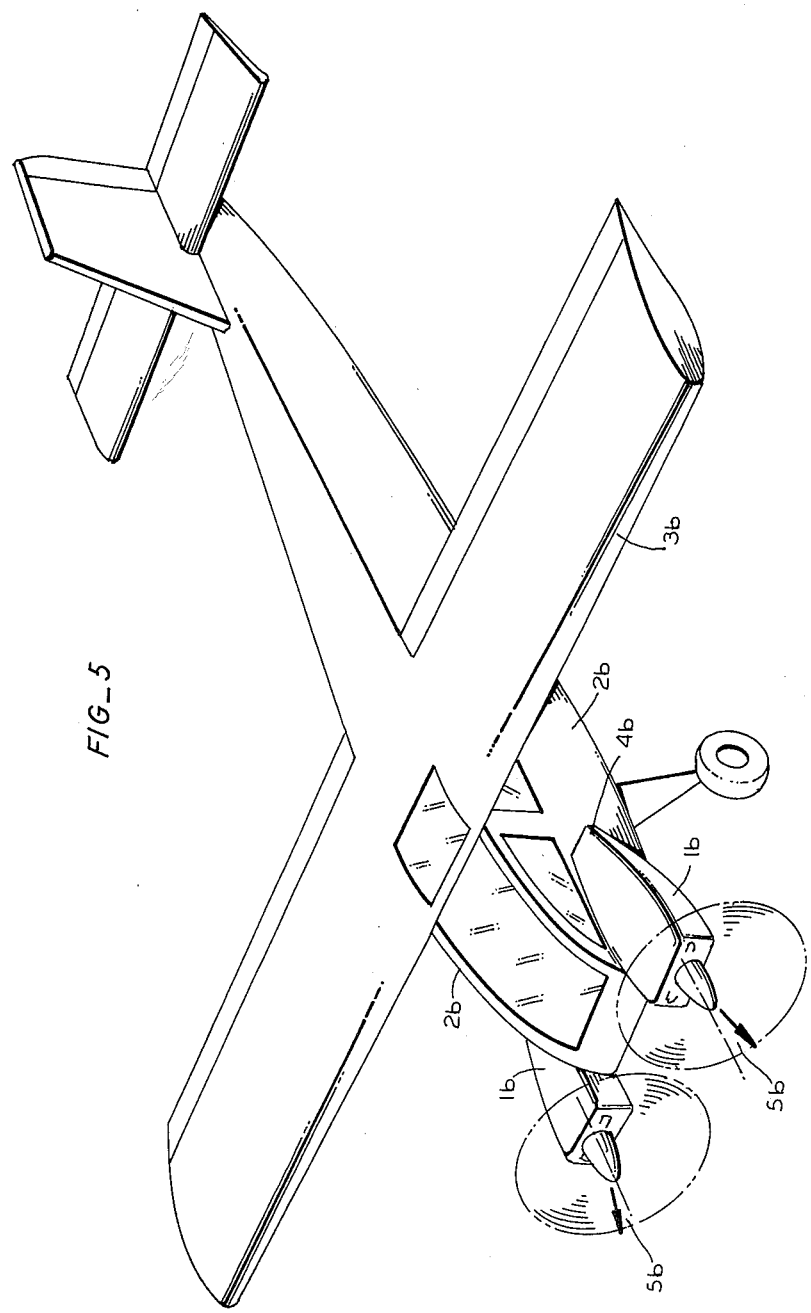
FIG_5
INVENTOR.
ALBERTO ALVAREZ CALDERON United States Patent Office 3,167,274
Patented Jan. 26, 1965

3,167,274
AERODYNAMIC SYSTEM AND APPARATUS
Alberto Alvarez Calderon, Palo Alto, Calif.
(Av. Salaverry 3465, Orrantia Mar, Lima, Peru)
Filed Aug. 21, 1963, Ser. No. 303,616
14 Claims. (Cl. 244—13)

The present invention relates to twin-engine aircraft. It is a continuation-in-part application to my patent application Serial No. 260,428 of Feb. 25, 1963.

In the past, twin engine aircraft have had engines mounted in nacelles in the wings separate from the fuselage.

This resulted in three undesirable characteristics:

(a) In single engine flight, the propeller thrust produces large yawing moments to the center of gravity having a moment arm approximately equal to the propeller radius plus half of the fuselage width plus propeller-fuselage clearance.

Certain twin engines aircraft have attempted to diminish this effect by unusual configurations: for example, a pre-World War II Grumann XFSF-1 had a fuselage nose which ended at the wing itself and did not project forward of it; the Grumann craft had two radial engines very close to each other to decrease single engine couples in yaw. The "Catalina" amphibian had the fuselage below a wing which carried two engines adjacent to each other. Also certain airfoil-shaped fuselages have had twin engines mounted close to each other to diminish yaw couples but these were not standard aircraft configurations and did not have a fuselage projecting ahead of the wings.

(b) For wing-mounted nacelles close but separate from the fuselage, there exists between the inboard side of the nacelle and the fuselage strong variations and deterioration of the flows on the wing due to the channel-like effect existing between the nacelle and fuselage which normally produces premature wing stall and drag increase, especially on rectangular or wings mounted as high wings, because of induced upwashes inherent on rectangular wings near the wing root.

(c) A serious structural complication exists in placing engines on wings, specially on high wing aircraft because the wing spars and frame inboard of the nacelles have to support the loads produced by the engine mass and forces.

It is the purpose of this invention to solve problems (a), (b) and (c) as follows:

(d) By using a peculiar arrangement and moving engine nacelles inboard all the way to the root of the wings (see FIG. 1) I decrease the arm of the yawing couple in single engine to approximately the radius of the propeller; yet I am able to retain a conventional wing and fuselage arrangement. Thus problem (a) is improved without the use of unusual configurations like the ones exemplified in the above mentioned Grumann and Catalina aircraft.

(e) Also by moving the nacelles inboard as described (see FIG. 3) I eliminate the channel between the fuselage and the nacelle which originates upwash and flow deterioration. Thus problem (b) is solved. Additionally, to control the flow on top of the cabin between the nacelles, an auxiliary airfoil between the nacelles is provided on top and separate from fuselage as shown in FIG. 1; this will be described later in detail.

(f) Finally, by moving nacelles inboard, there is obtained a structural advantage in the wing in that there are no wing beams and frame inboard of the nacelles, thus nacelle loads are transmitted directly to the fuselage.

The above advantages are embodied in a low-wing configuration shown in perspective in FIG. 4. The remaining figures are as follows: FIG. 5 shows a mid-wing craft.

FIG. 1 shows a front elevation of an aircraft embodying my invention.

FIG. 2 shows side elevation of said aircraft.

FIG. 3 shows a top view of said aircraft.

FIG. 5 shows an embodiment similar to FIG. 4 but on a high wing aircraft.

Figure 4:
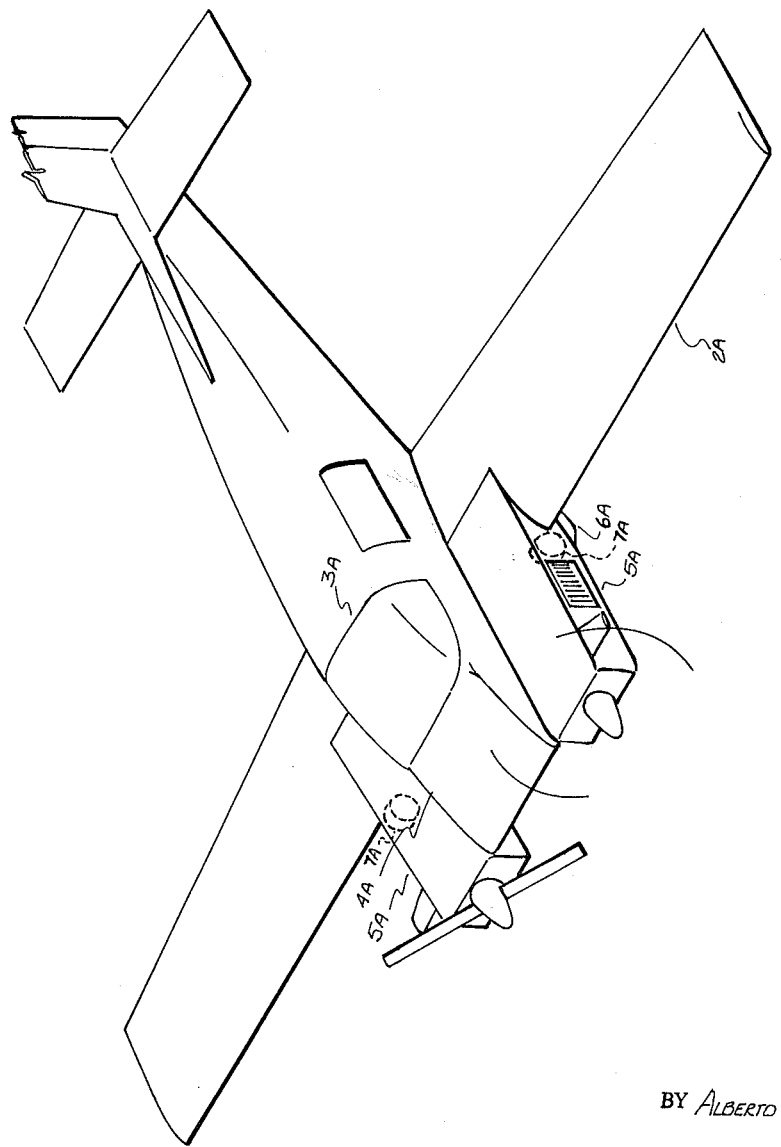
FIG. 4 shows an embodiment of the invention applied to twin engine low wing aircraft.

FIG. 1 shows, in front elevation, a fuselage 1 having vertical side surfaces 2 and a top surface 12. The craft mounts a pair of wings 6. At the junction of wings 6 with the upper edges defined by surface 12 and 2 of fuselage 1, there are mounted a pair of engine nacelles 3 each having a nacelle side surface 4 approximately in a projection of the plane of fuselage side surface 2. Each nacelle has a propeller 13 with a propeller axis 5 located at approximately one propeller radius outboard from a vertical central plane of the fuselage.

Another important feature of FIG. 1 is that there it is seen that the wing span extends outboard of the nacelle but there is no wing span between the nacelle and fuselage. Thus the nacelle loads appear directly on the fuselage; of special interest are inertia down loads of the nacelles in landing, which appear principally directly on fuselage sides 2 to go thence to gear 9, not affecting the wing structure nor introducing large couples to the fuselage as is usual. Thus there is unique structural cooperation between nacelles, fuselage and the landing gear shown.

FIG. 2 shows in side elevation the craft of FIG. 1. It is of particular importance to note how nacelles 3 and propeller 13 are mounted such as to permit a standard nose on the fuselage 1; the nose has a cabin 15 below and ahead of the wings and below the nacelles and propeller axis; the configuration is standard with respect to fuselage, wing, and cabin; yet the unique high wing and nacelle arrangement permit the advantages described earlier. It should be noticed, however, that in FIG. 2, in order to show clearly the top of the cabin area between the nacelles, the left nacelle has not been shown. It should be understood, however, that the undersurface of each nacelle may be faired to the lower surface of the wing as shown in FIG. 1.

FIG. 3 shows in top elevation my fuselage-wing nacelle configuration. Of special interest is the location of propellers 13 relative to each other with a small gap 14 between their arcs; also it is shown that the lever arm 16, between C.G. 17 and thrust line 5, is small. It is seen that the fuselage projects in front of the propellers and the cabin projects in front of the wing. Of great significance are fairings 19 between nacelles and fuselage as these permit an efficient flow on top of fuselage. Another most peculiar detail is that the wing leading edge exposed to the airstream begins outboard of the nacelle, indicating the absence of undesirable nacelle-fuselage gap.

An additional feature shown in FIGS. 1, 2, and 3 of my craft is auxiliary airfoil 11 between the nacelles. This is especially beneficial for the case of rectangular high wing aircraft, because a rectangular wing, by virtue of its planform, produces a large positive induced angle of attack at the wing's root, which normally stalls the wing at large angles of attack. This flow is compounded by the fuselage interference, and usually results in stall of the wing's center earlier than desired. This stall is undesirable in that it adds drag, takes away lift, and produces turbulence in the tail area.

I have discovered and tested in wind tunnel tests, that placing small auxiliary airfoil between the nacelles eliminates separation of flow from top of fuselage, greatly improving the flow. It should be noted that the auxiliary airfoil is not to be confused with a sesquiplane configuration (e.g. Douglas Dolphin 8) embodied in early amphibian aircraft which had auxiliary airfoils mounted on top of nacelles and extending outboard from the nacelles as well as between them. The sesquiplane concept pertains to addition of lift by adding separate lifting area. My auxiliary airfoil is different as follows:

(g) It acts to control flow over the fuselage between the nacelles and does not add, by virtue of its small area (FIG. 3) and small geometric incidence (FIG. 2), lift of significance by itself; it may act better in cruising flight at zero or negative lift as is the case for FIG. 2.

(h) Aerodynamically it does not project outboard from the nacelles (FIG. 1), if it did, tip vortex would be formed at their tips spoiling flow on top of the wing and adding induced drag.

(i) My auxiliary airfoil has no induced drag or tip vortex per se; its camber is greater than the wings camber (FIG. 2).

(j) My auxiliary airfoil together with nacelle side walls and top fuselage surface forms a hollow tube or closed channel of contracting top and bottom walls to control flow between the nacelles.

(k) There is a unique and peculiar structural cooperation in placing inboard nacelles as on FIG. 1 to support the auxiliary airfoil in that the span of auxiliary airfoil is substantially equal to, and need not exceed, the width of the fuselage (FIG. 3).

(l) Finally, my auxiliary airfoil acts not as a sesquiplane surface (adding lift by adding area) but as a slot-type surface (adding lift by flow control at main surface); thus my auxiliary airfoil is located adjacent to, or ahead of, the minimum pressure point of the fuselage adjacent to the nacelles. In FIG. 2, I show the trailing edge of my auxiliary airfoil located approximately at quarter chord of the main wing; sesquiplanes have their sesquiplane area further to the rear of than the one shown by applicant.

One additional feature of my craft of FIGS. 1, 2, and 3 is the unique cooperation of the retractable wheel system and wing strut. An efficient strut should have a large angle between strut and wing as shown by large angle 10. Angle 10 can be made large by virtue of retractable gear housing and strut support 8 which also permits a wide track for gear 8. Gear 8 is made retractable by pivotal action about axis 20. The use of a side protuberance to house a retracted gear or to support a wing strut are not new. What is new is the use of a side protuberance to both serve as a support for a wide track retractable gear and to support an efficient wing strut, since normally an externally braced aircraft does not have a retractable gear; furthermore, in my embodiment that very gear acts in unique cooperation to handle engine landing loads transmitted through the sides of the fuselage as described earlier without acting in a significant way on the wings.

FIG. 4 shows an embodiment of my invention on a low wing aircraft. It is a unique and superior twin engine low wing aircraft configuration.

Specifically there is shown a fuselage having low wings 2a having upper and lower surfaces joined at a leading edge, a cockpit 3a, and a nose portion 4a. On the forward end of the fuselage there are mounted on its side-surfaces a pair of engine nacelles 5a in streamlined cheek-line disposition with the rear nacelle end connected and faired to the wing roots at the junction of the wing and the fuselage, with the top surfaces of the nacelles faired in contact with upper surfaces of the wings. Evidently, in single engine operation, as shown in the drawing, the yawing couples of the operative propeller thrust have an arm to the center vertical plane of the fuselage approximately equal to the propeller radius, instead of the usual arm which is the sum of propeller radius plus half fuselage width plus fuselage-propeller clearance. This arm difference is of importance. For example, for a typical small twin engine craft the arm of unsymmetric thrust couple is: 2 feet due to half fuselage width; plus ½ foot clearance; plus 3 feet propeller radius, which equals to a 5½ feet arm. In contrast, in my design the arm is equal to 3 feet radius plus ¼ foot clearance, equal to a 3¼ feet, which diminishes unsymmetric couples in yaw trim by nearly one half; and improves climb.

In addition, most significant of my design is its excellent high speed performance, since the area of one side of each cowl effectively disappears, and the number of nacelle-side to wing junctions for each nacelle decreases from two to one.

Also of aerodynamic importance is the shape of the nacelles and nose of fuselage. On my FIG. 4, as well as on FIG. 5, I show the upper horizontal leading edge of each nacelle approximately parallel with a rectilinear spanwise airfoil shaped upstream edge of the fuselage's nose.

To increase the clearance between fuselage nose to propeller, the upstream edge of the fuselage may be more slightly rearward of the upstream edge of the nacelle, as shown on FIG. 5, but should preferably remain upstream of the wing's leading edge.

To increase visibility, it would also be possible to make the lower nacelle horizontal leading edge colinear with the fuselage upstream edge; this would add drag in cruise, however.

FIG. 4 shows, also, lower wing fences 6a projecting from the side of the nacelle to decrease nacelle-induced upwash, and auxiliary nose elevators which are especially useful since they can have a long moment arm to center of gravity on a twin engine configuration.

Evidently, the configuration excels for flat horizontally-opposed piston engines and turbo props. However, it is not recommendable for radial piston engines which would not permit—by virtue of their frontal area and shape—a clean blending of the fuselage and nacelle side area and of the wing-fuselage-nacelle joint, in addition to restricting the pilot's visibility and making it virtually impossible to provide the nose shape shown for the fuselage and nacelles.

As an alternate embodiment of the one shown in FIG. 4, the same type of fuselage nose and nacelle installation may be retained on a high wing or a midwing configuration. In this alternate arrangement shown in FIG. 5, the nacelles 1b which have their surfaces protruding from the fuselage's side 2b, are not faired into the wing 3b (the wing is removed to a different elevation) but the upper and lower surfaces of the engine's nacelle are curved into each other much as the rear of an airfoil, as shown in the figure at 4b. A toe-out angle is also shown in the nacelles as angle 5b.

The arrangements described above in connection to FIGURES 4 and 5 are especially meritorious for modification of existing single engine aircraft in that the twin engine configuration obtained would not require a modification in the wing for the purpose of supporting the engine. In this respect, and because of its small yawing couples in single engine flight, my arrangement constitutes a unique and superior solution for modification of single engine aircraft to twin-engine aircraft. The embodiment of FIG. 5, however, is definitely inferior to that of FIGS. 4 and 1 in that in FIG. 5 there is no unique cooperation between the nacelle fairing and the wings. FIG. 4 shows also unique cooperation by fairing retractable gear 7A in the nacelles between wing and engine.

Various modifications and alternations of the above structures can be made without departing from the spirit of the invention. For example, the nacelles may easily incorporate toe-out, or have the propeller discs partially one behind the other, or even synchronized to have discs intermesh without blade collision.

What I claim is:
1. An aircraft having a fuselage with said fuselage having side surfaces; a pair of wings each having a leading edge, and top and bottom surfaces extending laterally from a joint with said side surfaces; a pair of engine nacelles each having a top surface with an inboard edge portion, said inboard edge portion being generally contiguous with said joint in plan view, said nacelle top surface having a rearward edge portion, said rearward edge portion joining one of said wing surfaces, said nacelle top surface having a forward edge located forwardly of said leading edges of said wings.

2. The aircraft of claim 1 further characterized in that said fuselage has a cabin region, in that the principal portion of said cabin region is located below the elevation of said bottom wing surfaces; in that said cabin region has a cabin forward end portion separate from, well in advance of, and below said leading edges of said wings, and in that said nacelles protrude forwardly of said leading edges at an elevation approximately equal to that of said wings well above the elevation of said cabin forward end portion, with each of said nacelles being adapted to house an engine driving a propeller.

3. The structure of claim 2 further characterized in that said nacelles have inboard side surface portions exposed to the airstream and separate from said forward end portion of said cabin, with said inboard side surface portions having rearward end portions generally contiguous in plan view with side surface portions of said fuselage adjacent said cabin region; and in that a streamlined fillet is provided between surface portion of said cabin region adjacent said rearward edge portions of said nacelles and a nacelle surface portion adjacent said rearward end portions of said inboard side surface portions of each of said nacelles.

4. The aircraft of claim 1 further characterized in that said fuselage has a top surface adjacent said joints, in that said inboard edge portions of said nacelles adjacent said top surface protrude above said top surface, and in that an auxiliary airfoil is mounted between said nacelles and above said top surface of said fuselage, said auxiliary airfoil being supported by said nacelles and terminating at said inboard edge portions, the span of said auxiliary airfoil being no greater than substantially the fuselage width between said joints.

5. The structure of claim 2 further characterized in that said cabin region has a bottom surface, in that a streamlined landing gear support which is adapted to decrease the drag of a landing gear extends laterally from said cabin region adjacent said bottom surface, in that a wing strut is provided between the outboard end of each of said supports and a wing location on one of said wings well outboard of said nacelles, and in that the principal portion of the vertical forces due to said engines are adapted to be transmitted from said nacelles external from said struts and substantially entirely and directly downwards by side surface of said cabin region to said landing gear supports.

6. An aircraft comprising a conventional elongated streamlined fuselage having a tail end portion, a fuselage rear portion, a cabin region, a fuselage nose portion, substantially continuous fuselage side surfaces extending from said tail end portion to said cabin region adjacent said nose portion, and fuselage top and bottom surfaces, with the maximum width of said fuselage being defined by surface portions of said fuselage which are exposed to the airstream substantially determining the lateral limits of said cabin region, said fuselage having a length at least as great as approximately five times said maximum fuselage width and a maximum depth between said top and bottom surfaces of said fuselage at least as great as approximately said maximum fuselage width; tail surfaces mounted on said fuselage adjacent said tail end portion; a pair of conventional wings extending laterally from said fuselage with each of said wings having an upper surface, a lower surface, a leading edge, a trailing edge, and a wing root portion contiguous with one of said side surfaces of said fuselage; said wings being located on said fuselage in a conventional high-wing arrangement with said surfaces of said wing adjacent said top surface of said fuselage, with said cabin region located approximately completely below said wings adjacent said root portions, and with said nose portion of said fuselage being separate and remote from said leading edges of said wings; a pair of engine nacelles on said aircraft each adapted to house an engine driving a propeller, with each of said nacelles having an upper surface with a rearward end having an inboard edge portion, an inboard nacelle side surface portion, an outboard nacelle side surface portion, a lower nacelle surface portion, and a nacelle forward end; each of said nacelles being located on said aircraft with said inboard edge portion of said rearward end substantially contiguous in plan view with one of said root portions, with said upper nacelle surface faired to and in contact with an upper surface portion of one of said wings adjacent one of said root portions, with said lower nacelle surface portion faired to and in contact with a lower surface portion of one of said wings adjacent said root portions at an elevation above the principal portion of said cabin region, with said inboard nacelle side surface portion being exposed to the airstream well above and separate from said fuselage nose portion, with said outboard nacelle side surface portion being exposed to the airstream and in contact with the leading edge of one of said wings, and with substantially the entire leading edges of said wings which are exposed to the airstream being located outboard of said outboard nacelle side surface portions.

7. An aircraft having an elongated streamlined central fuselage with a tail end, a cabin region, a nose portion, a lower surface and side surfaces; a pair of wings mounted on said fuselage adjacent to said lower surface with a principal portion of said cabin region being defined laterally by portions of said side surfaces at an elevation well above said wings, with each of said wings extending laterally from one of said side surfaces and having a wing root portion contiguous to a side surface of said fuselage; a pair of engine nacelles on said aircraft with each of said nacelles being adapted to house an engine driving a propeller, each nacelle being located on said aircraft protruding laterally from one side of said fuselage nose portion and forwardly from one of said wing root portions in a low drag disposition in which the upper surface of each of said nacelles have inboard portions which are faired laterally in contact with a side surface portion of said fuselage adjacent said nose portion and extend rearwardly to smoothly contact upper surface portions of one of said wing root portions.

8. The structure of claim 7 further characterized in that the width between said side surfaces of said fuselage adjacent the trailing edges of said wings is approximately equal to the distance between said nacelle inboard edge portions adjacent said fuselage nose portion.

9. The structure of claim 8 further characterized in that said nose portion is separate from said wings and occupies substantially the entire width between forward portions of said nacelle inboard edge portions, and in that substantially the entire leading edges of said wings which are exposed to the airstream are located outboard of said nacelles.

10. The aircraft of claim 1 further characterized in that said fuselage has a cabin region with a rear end portion located adjacent the trailing edges of said wings, in that the principal portion of said cabin region is located above the elevation of the top surfaces of said wings, in that said fuselage has a nose portion separate from said wings and protruding well ahead of forward portions of said joints between and in contact with portions of said inboard edge portions of said nacelles, in that said nacelle top surfaces are outboard of said nose portion, in that the width of said fuselage nose portion is of the same order of magnitude as the width of the rear end portion of said cabin region of said streamlined elongated fuselage, in that said nacelles have outboard side surface portions in contact with the leading edges of said wings well to the rear of said nose portion of said fuselage, and in that substantially the entire leading edges of said wings which are exposed to the airstream are located outboard of said nacelle outboard surface portions.

11. An aircraft comprising a conventional elongated streamlined fuselage having a tail end portion, a fuselage rear portion, a cabin region, a fuselage nose portion, substantially continuous fuselage side surfaces extending from said tail end portion to said cabin region adjacent said nose portion, and fuselage top and bottom surfaces, with the maximum width of said fuselage being defined by side surface portions of said fuselage which are exposed to the airstream substantially determining the lateral limits of said cabin region, said fuselage having a length at least as great as approximately five times said maximum fuselage width and a maximum depth between said top and bottom surfaces of said fuselage at least as great as approximately said maximum fuselage width; tail surfaces mounted on said fuselage adjacent said tail end portion; a pair of conventional wings extending laterally from said fuselage with each of said wings having an upper surface, a lower surface, a leading edge, a trailing edge, and a wing root portion contiguous with one of said side surfaces of said fuselage; said wings being located on said fuselage in a conventional low wing arrangement with said surfaces of said wing adjacent said bottom surface of said fuselage, with said cabin region located approximately completely above said wings adjacent said root portions, and with said nose portion of said fuselage being separate and remote from said leading edges of said wings; a pair of engine nacelles on said aircraft each adapted to house a horizontally opposed piston engine driving a propeller, with each of said nacelles having an upper surface with a rearview with one of said root portions, with said upper nacelle side surface portion, a lower nacelle surface portion, and a nacelle forward end; each of said nacelles being located on said aircraft with said inboard edge portion adjacent said rearward end being substantially contiguous in plan view with one of said root portions, with said upper nacelle surface faired to an in contact with an upper surface portion of one of said wings adjacent one of said root portions, with said lower nacelle surface portion faired to and in contact with a lower surface portion of one of said wings adjacent said root portions at an elevation below the principal portion of said cabin region, with the principal portion of said inboard nacelle side surface portion being faired laterally in contact with said fuselage nose portion, with said outboard nacelle side surface portion being exposed to the airstream and in contact with the leading edge of one of said wings, and with substantially the entire leading edges of said wings which are exposed to the airstream being located outboard of said outboard nacelle side surface portions.

12. An aircraft having a central fuselage with a vertical plane of symmetry, a nose portion with an upper surface, and fuselage side surfaces; a pair of wings extending laterally on said aircraft one on each side of said fuselage with said wings having a wing root contiguous with said side surfaces of said fuselage; and to the rear of said fuselage nose portion, a pair of engine nacelles on said aircraft one separate from the other on each side of said central plane at a location upstream from said wings, each of said nacelles being adapted to house an engine driving a propeller, with each of said nacelles having a downstream nacelle end portion in contact with and smoothly faired into a portion of one of said wing roots, an outboard streamwise nacelle side portion located outboard of a side surface of said fuselage, an inboard streamwise nacelle side portion being in contact with said nose portion of said fuselage and defining a streamwise nacelle junction with said nose portion, and a nacelle top surface portion extending from said downstream end forwardly between and in contact with said nacelle streamwise side portions with said top surface being positioned outward of said upper surface of said nose portion; said streamwise nacelle junction of each of said nacelles being located upstream of and smoothly directed rearwardly into a streamwise fuselage junction between one of said side surfaces of said fuselage to the rear of said nose portion and a surface portion adjacent one of said wing roots, with said nacelle and fuselage junctions on each side of said fuselage combining to form a continuous and smooth streamlined fillet which in plan view defines the approximate outer contours of a low drag streamlined elongated fuselage body portion.

13. The aircraft of claim 1 further characterized in that each of said wings have trailing edges, in that said fuselage has a cabin region with side surfaces exposed to the airstream, in that the width between said exposed side surfaces of a rear portion of said cabin region generally contiguous to said trailing edges of said wing is approximately equal to the width between said exposed side surfaces of a forward portion of said cabin region generally contiguous to said inboard edge portions of said nacelles, in that said side surfaces of said fuselage have in plan view substantially continuous uninterrupted streamwise contours extending from a fuselage portion contiguous to said forward portion of said cabin region to a tail end portion of said fuselage in a streamlined direction approximately parallel to the flight direction of said aircraft, in that said fuselage has a nose portion separate from and well forward of the leading edges of said wings, in that each of said nacelles has an outboard side surface in contact with one of said wings and is adapted to house an engine driving a propeller, and in that substantially the entire leading edges of said wings which are exposed to the airstream are located outboard of said nacelle outboard side surfaces.

14. An aircraft having a central fuselage with a central vertical plane, a nose portion, and side surfaces; a pair of wings mounted on said aircraft extending laterally from said fuselage outboard from said side surfaces with said wings having leading edges; a pair of separate propulsive powerplants mounted on said aircraft one on each side of said central plane with each of said powerplants having a fixed nacelle with a nacelle root portion located substantially at and faired smoothly into the joint of one of said wings and said fuselage and contiguous to one of said side surfaces with said nacelle projecting forwardly from said joint in an outwardly position in which the outboard side surface of said nacelle extends in a streamwise direction to fair into the leading edges of said wings at a wing location outboard from said side surfaces of said fuselage; with substantially the entire surfaces of said leading edges of said wings which are exposed to the airstream being located outboard from said nacelle side surfaces and with each of said powerplants having a propeller with a propeller hub located at a perpendicular distance from said central plane approximately equal to the radius of said propeller.

References Cited by the Examiner

UNITED STATES PATENTS 1,981,237   11/34   Loughead _____ 244—55

MILTON BUCHLER, *Primary Examiner.*

RALPH D. BLAKESLEE, *Examiner.*